US012771228B2

(12) United States Patent
Kacetl et al.

(10) Patent No.: US 12,771,228 B2
(45) Date of Patent: Oct. 20, 2026

(54) MULTILEVEL MODULATION

(71) Applicant: Rimac Technology LLC, Sveta Nedelja (HR)

(72) Inventors: Jan Kacetl, Pardubice (CZ); Tomá Kacetl, Pardubice (CZ); Wasim Sarwar Dilov, Zagreb (HR); Jack Charles Holden, Witney (GB)

(73) Assignee: Rimac Technology LLC, Sveta Nedelja (HR)

( * ) Notice: Subject to any disclaimer, the term of this patent is extended or adjusted under 35 U.S.C. 154(b) by 263 days.

(21) Appl. No.: 18/668,995

(22) Filed: May 20, 2024

(65) Prior Publication Data

US 2024/0396425 A1 Nov. 28, 2024

(30) Foreign Application Priority Data

May 22, 2023 (EP) .................................... 23174509

(51) Int. Cl.
*H02M 1/00* (2006.01)

(52) U.S. Cl.
CPC ................................. *H02M 1/0067* (2021.05)

(58) Field of Classification Search
CPC ............. H02M 1/0067; H02M 7/5395; H02M 7/483; H02M 7/49
See application file for complete search history.

(56) References Cited

U.S. PATENT DOCUMENTS 5,933,339 A * 8/1999 Duba ...................... H02P 27/16 363/71
2008/0298104 A1* 12/2008 Sachdeva ................ H02M 7/49 363/98
2025/0119067 A1* 4/2025 Kacetl .................. H02M 1/007

OTHER PUBLICATIONS

Jariwala et al., "Optimized Modulation Technique for Cascaded H-Bridge Multilevel Inverter," Innovations in Power of Advanced Computing Technologies (i-PACT), 2021.
Ronanki et al., "Hybrid Multi-carrier PWM Technique with Computationally Efficient Voltage Balancing Algorithm for Modular Multilevel Converter," IEEE International Conference on Industrial Electronics for Sustainable Energy Systems (IESES), 2018.
Ye et al., "Self-Balanced Switched-Capacitor Thirteen-Level Inverters With Reduced Capacitors Count," IEEE Transactions on Industrial Electronics, Jan. 2022, vol. 69, No. 1.
(Continued)

*Primary Examiner* — Kyle J Moody
(74) *Attorney, Agent, or Firm* — Hodgson Russ LLP

(57) ABSTRACT

A method for controlling a multilevel converter is disclosed. The method can include assigning, based on at least one variable parameter, a first number N of power converter modules to a first group; assigning, based on the at least one variable parameter, a second number M of the power converter modules to a second group; controlling a switching state of each of the first number N of the power converter modules assigned to the first group by applying a first switching pattern to the first number N of the power converter modules for generating a first output signal; and controlling a switching state of each of the second number M of the power converter modules assigned to the second group by applying a second switching pattern to the second number M of the power converter modules for generating a second output signal.

19 Claims, 6 Drawing Sheets

(56) References Cited

OTHER PUBLICATIONS

Bassi, "A New PWM Technique for Cascade H-Bridge with Reduced Switching Losses," International Conference on Industrial Engineering, Applications and Manufacturing (ICIEAM), 2019.
Atkar et al., "Control of Seven Level Cascaded H-Bridge Inverter by Hybrid SPWM Technique," IEEE International Conference on Power Electronics, Drives and Energy Systems (PEDES), 2016.
Chen et al., "A Novel Hybrid Modulation Strategy for MMC Energy Storage System," International Conference on Power Energy Systems and Applications, 2022.
EPO, Extended European Search Report for EP Application No. 23174509.2, Oct. 27, 2023.

* cited by examiner

MULTILEVEL MODULATION

CROSS-REFERENCE TO RELATED APPLICATION

This application claims priority to European Patent Application No. 23174509.2, filed May 22, 2023, the entire disclosure of which is incorporated herein by reference.

FIELD

The present disclosure relates to the technical field of multilevel modulation. More particularly, the present disclosure relates to a multilevel converter and a method for controlling a multilevel converter.

BACKGROUND

A multilevel converter is a power conversion system that can generate a multistep voltage waveform from several DC input voltages. The multistep voltage waveform has at least three levels. The number of levels of the multilevel converter can be defined as the number of steps or constant voltage levels that can be generated by the multilevel converter between the output terminal and any arbitrary internal reference node.

A multilevel converter is described for example in J. Rodriguez at al.: "Multilevel converters: An enabling technology for high-power applications", Proceedings of the IEEE, vol. 97, no. 11, pages 1786-1817, 2009.

The multilevel converter finds a vast application in many technology fields, amongst others in the field of power conversion, for example in motor vehicles.

There are many different topologies for a multilevel converter, like for example, a diode clamped multilevel converter, flying capacitors multilevel converter and cascaded multilevel converter, but also combinations and variations thereof are readily utilized. Some of these topologies, like the flying capacitors multilevel converter and the cascaded multilevel converter have a modular structure composed of multiple power converter modules, also called cells.

The output voltage of a multilevel converter is typically synthesized by a multilevel modulation technique. Several modulation techniques are applicable to a multilevel converter. The modulation techniques for a multilevel converter can be classified depending on the average switching frequency with which they operate into low switching frequency technique and high switching frequency technique. An example of a high frequency switching technique is a multicarrier pulsed width modulation (PWM). Examples of a multicarrier PWM are a phase shifted carrier PWM (PSC PWM) and a level shifted carrier PWM (LSC PWM) which are among the most popular modulation techniques. These modulation techniques can be easily implemented on a microcontroller, a field programmable gate array (FPGA) or an application specific integrated circuit (ASIC). These multicarrier PWM techniques use a carrier waveform signal for each of the power converter modules of the multilevel converter.

The phase shifted carrier PWM (PSC PWM) evenly distributes the conduction times of the individual power converter modules of the multilevel converter and effectively increases the effective output switching rate of the multilevel converter but does not allow for active control of the conduction times of the individual power converter modules to balance them in the distribution of the workload between the individual power converter modules.

The level shifted carrier PWM (LSC PWM) does not distribute the conduction times of individual power converter modules evenly but utilizes, as a balancing algorithm, sorting based algorithm of the individual power converter modules of the multilevel converter and carrier waveform signals swapping.

Modular structures with multiple DC sources, like the cascaded multilevel converter, implement also a control algorithm to keep the DC sources in balance. Such control algorithm is normally called a balancing algorithm.

Hence, each modulation technique has its own drawbacks and advantages, and the applied modulation technique depends strongly on the field of application of the multilevel converter. Accordingly, the balancing in the distribution of the workload between the individual power converter modules of the multilevel converter depends strongly on the applied modulation technique.

Therefore, there is a need for improved balancing in the distribution of the workload between the individual power converter modules of the multilevel converter.

Accordingly, it is an object of the present disclosure to provide for an improved balancing in the distribution of the workload between the individual power converter modules of the multilevel converter.

SUMMARY

The mentioned problems and drawbacks are addressed by the subject matter of the independent claims. Further preferred embodiments are defined in the dependent claims.

In a first aspect of the present disclosure there is provided a method for controlling a multilevel converter comprising a plurality of energy sources and a plurality of power converter modules, each power converter module comprising at least two switching elements, the method comprising: assigning, based on at least one variable parameter, a first number N of the plurality of power converter modules to a first group; assigning, based on the at least one variable parameter, a second number M of the plurality of power converter modules to a second group; controlling the switching state of each of the first number N of the plurality of power converter modules assigned to the first group by applying a first switching pattern to the first number N of the plurality of power converter modules for generating a first output signal; and controlling the switching state of each of the second number M of the plurality of power converter modules assigned to the second group by applying a second switching pattern to the second number M of the plurality of power converter modules for generating a second output signal, wherein the first switching pattern is different than the second switching pattern.

In a second aspect of the present disclosure, there is provided a multilevel converter comprising a plurality of energy sources and a plurality of power converter modules, each power converter module comprising at least two switching elements, the multilevel converter comprising means adapted to execute the steps of the method of the first aspect.

In a third aspect of the present disclosure, there is provided a computer program comprising instructions which, when the program is executed by a computer causes the computer to execute the steps of the method of the first aspect.

BRIEF DESCRIPTION OF THE DRAWINGS

Embodiments of the present disclosure, which are presented for better understanding the inventive concepts, but which are not to be seen as limiting the disclosure, will now be described with reference to the figures in which.

DETAILED DESCRIPTION

Figure 1:
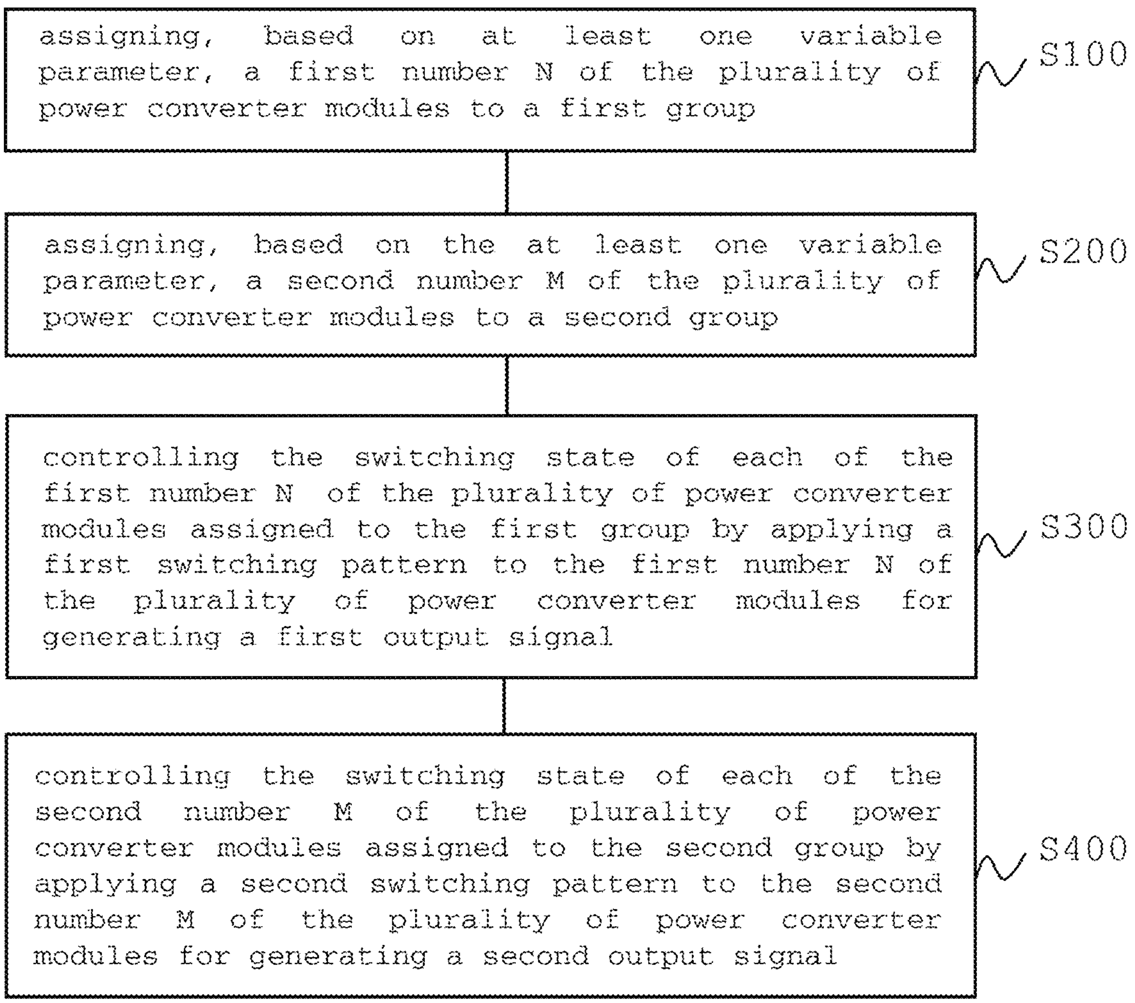
FIG. 1 is a flow chart showing the steps of the method for controlling a multilevel converter according to an embodiment of the present disclosure.

To achieve the above-identified object, the present disclosure proposes using at least two different switching patterns for controlling the switching state of individual power converter modules of the multilevel converter which are dynamically assigned to at least two different groups. The at least two different switching patterns may be based on different modulation techniques that provide for different dynamic modulation. The first modulation technique applied to the power converter modules assigned to the first group may provide for a low dynamic modulation, while the second modulation technique applied to the power converter modules assigned to the second group may provide for a high dynamic modulation. The power converter modules assigned to the first group may produce fixed voltage levels in the output voltage, while the power converter modules assigned to the second group may synthesize the output voltage by high dynamic switching.

In embodiments of the present disclosure, as will be elaborated further below, the second modulation technique may be, for example, the phase shifted carrier PWM (PSC PWM). In embodiments of the present disclosure, as will be elaborated further below, the first modulation technique may be, for example, the level shifted carrier PWM (LSC PWM) or other modulation technique which results in the power converter modules assigned to the first group producing fixed voltage levels in the output signal. The PSC PWM and the LSC PWM use a carrier waveform signal per power converter module of the multilevel converter.

However, this is not limiting, and in embodiments of the present disclosure other modulation techniques with different switching dynamic may be used, for example modulation techniques in which more than one carrier waveform signal per power converter module is applied or complex PWM peripherals are used. The multiple carrier waveform signals may be phase shifted, typically by 180°.

The provided modulation technique for a multilevel converter according to the present disclosure effectively increases the output switching rate and introduces balancing in the distribution of the energy conversion between the individual power converter modules. The provided modulation technique does not introduce additional distortion at the power converter module switching rate and its harmonics.

In a multilevel converter, depending on how the individual power converter modules of the multilevel converter are connected together, the distribution of energy conversion (workload or load) between the different power converter modules of the multilevel converter can be controlled. For the distribution of the energy conversion and hence for the distribution of the workload (load) between the power converter modules of the multilevel converter at least the following factors play a role: i) the modulation technique to be applied to the power converter modules of the multilevel converter, which comprises determining how many power converter modules will participate in the energy conversion, which in turn depends on the number of required voltage levels of the demanded output voltage of the multilevel converter, and ii) the scheduling of the individual power converter modules of the multilevel converter for energy conversion, which comprises determining which power converter modules will participate in the distribution of the energy conversion. The scheduling controls therefore the distribution of the workload (load) between the individual power converter modules of the multilevel converter.

The present disclosure focuses on how to produce the demanded (desired) output voltage of the multilevel converter, by considering applying the appropriate modulation technique and selecting the power converter modules to participate in the energy conversion in the multilevel converter. Hence, in one aspect, the present disclosure focuses on how to perform the scheduling of the individual power converter modules to participate in the energy conversion in the multilevel converter.

FIG. 1 shows the steps of the method for controlling a multilevel converter according to the embodiment of the present disclosure.

Figure 2:
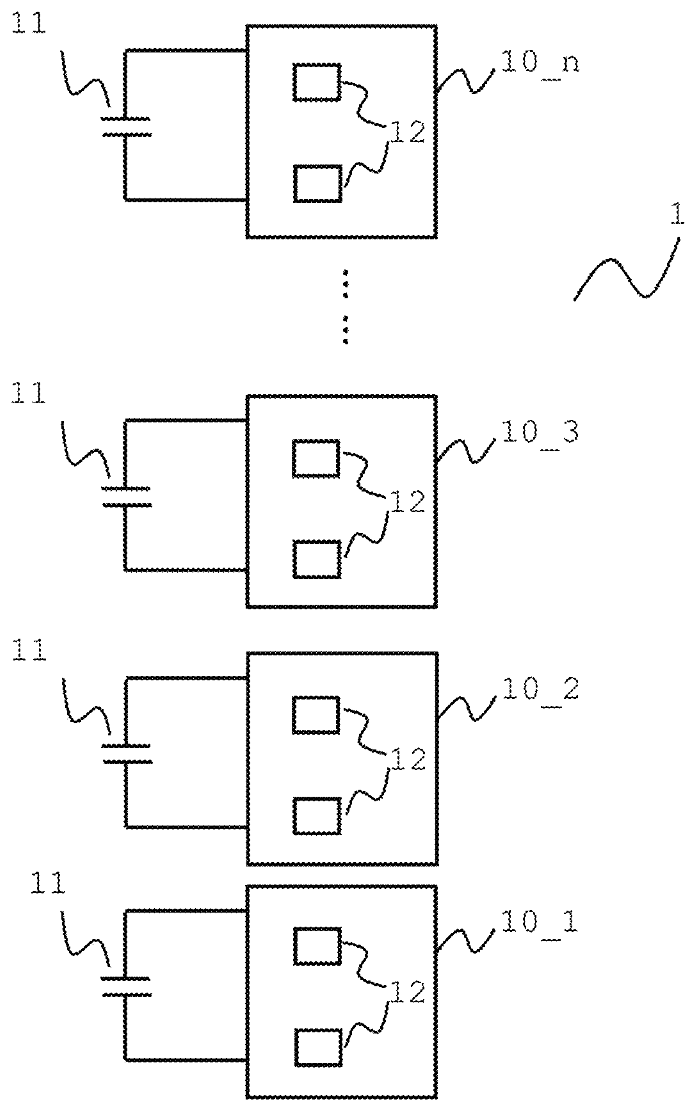
FIG. 2 is a schematic block diagram of a multilevel converter according to an embodiment of the present disclosure.

FIG. 2 shows a schematic block diagram of the multilevel converter 1 according to the embodiment of the present disclosure. The multilevel converter 1 comprises a plurality of energy sources 11 and a plurality of power converter modules 10_1, 10_2, 10_3, . . . , **10_*i*, . . . , 10_*n* (i=1 . . . n). Each power converter module 10_*i* comprises at least two switching elements 12. Each one of the at least two switching elements 12** may be a solid-state switching element, like for example a two terminal solid-state switch or a three terminal solid-state switch. Examples of two-terminal solid-state switch include, without limiting the present disclosure, a PIN (positive-intrinsic-negative) diode and Schottky diode. Examples of a three-terminal solid-state switch include, without limiting the present disclosure, MOSFET, JFET, IGBT, BJT and thyristor.

It is to be understood that even though FIG. 2 shows each energy source 11 as being connected to a respective one of the power converter modules 10_1, 10_2, 10_3, . . . **10_*n*, this is not limiting, and other connecting configurations are also possible. The energy source 11 may be any kind of energy source, like for example a battery, a photovoltaic cell, a fuel cell, an electromechanical power converter or a capacitive energy source. It is further to be understood that the present disclosure is not limited to a specific topology of the multilevel converter 1. For example, the power converter modules 10_1, 10_2, 10_3, . . . , 10_*n* may be connected in a string and a plurality of such strings may be provided in the multilevel converter 1. Each string may represent a phase or an arm of the multilevel converter 1**.

According to the method for controlling the multilevel converter 1 of the embodiment of the present disclosure, the method comprises, in step S100, assigning, based on at least one variable parameter, a first number N of the plurality of power converter modules 10_1, 10_2, 10_3, . . . **10_*n* to a first group. The method further comprises, in step S200, assigning, based on the at least one variable parameter, a second number M of the plurality of power converter modules 10_1, 10_2, 10_3, . . . 10_n to a second group. The first number N of the plurality of power converter modules 10_1, 10_2, 10_3, . . . 10_n assigned to the first group do not have to be contiguous power converter modules in the above-mentioned string. The same applies to the second number M of the plurality of power converter modules 10_1, 10_2, 10_3, . . . 10_n** assigned to the second group.

The method further comprises, in step S300, controlling the switching state of each of the first number N of the plurality of power converter modules 10_1, 10_2, 10_3, . . . 10_n assigned to the first group by applying a first switching pattern to the first number N of the plurality of power converter modules 10_1, 10_2, 10_3, . . . 10_n for generating a first output signal, and, further comprises, in step S400, controlling the switching state of each of the second number M of the plurality of power converter modules 10_1, 10_2, 10_3, . . . 10_n assigned to the second group by applying a second switching pattern to the second number M of the plurality of power converter modules 10_1, 10_2, 10_3, . . . 10_n for generating a second output signal. In the method for controlling the multilevel converter 1 of the embodiment of the present disclosure, the first switching pattern is different than the second switching pattern.

Hence, according to the method for controlling the multilevel converter 1 of the embodiment of the present disclosure, the first switching pattern is different from the second switching pattern.

In embodiments of the present disclosure, the term "switching pattern" may represent the collection of switching states of the individual power converter modules in the corresponding group at least for a predetermined period of time. The switching state of each of the power converter modules 10_i may be any one of a conduction state, a non-conduction state or a paralleled converter modules configuration state. More specifically, in one or more embodiments of the present disclosure, the switching state of each of the power converter modules 10_i may be one of a series connection positive state, a series connection negative state, a bypass positive state, a bypass negative state, a paralleled converter modules configuration state and a passive state.

In one embodiment of the present disclosure, the first switching pattern is different than the second switching pattern at least in the switching rate of the power converter modules assigned to each of the first group and the second group. In one embodiment of the present disclosure, the switching rate of the first number N of the plurality of power converter modules 10_1, 10_2, 10_3, . . . 10_n assigned to the first group may be lower than the switching rate of the second number M of the plurality of power converter modules 10_1, 10_2, 10_3, . . . 10_n assigned to the second group. In one embodiment of the present disclosure, the first group may also be called, without being limited to, a low switching dynamic group while the second group may be called, without being limited to, a high switching dynamic group. Accordingly, the workload (load) distributed to the first group may be different than the workload (load) distributed to the second group. In one or more embodiments of the present disclosure, the workload (load) distributed to the first group may be higher than the workload (load) distributed to the second group.

In one embodiment of the present disclosure, the first switching pattern may be based on the level shifted carrier PWM (LSC PWM). As elaborated above, the level shifted carrier PWM is a multicarrier PWM technique which uses a carrier waveform signal for each of the power converter modules. In the level shifted carrier PWM based switching pattern, the carrier waveform signals for the individual power converter modules are arranged to have different amplitude levels. The carrier waveform signals are arranged in a vertical shift. Each carrier waveform signal is set between two voltage levels.

Figure 3A:
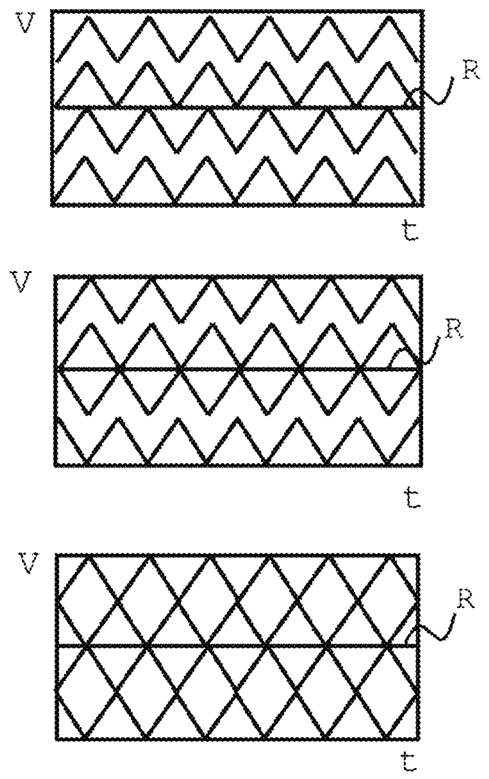
FIG. 3A shows a level-shifted carrier PWM for four carrier waveform signals.

FIG. 3A shows the level shifted carrier PWM for four carrier waveform signals. The carrier waveform signals can be arranged in a vertical shift in phase with each other (upper diagram in FIG. 3A), or with all the positive carrier waveform signals in phase with each other and in opposite phase of the negative carrier waveform signals (middle diagram in FIG. 3A), or by alternating the phase between adjacent carrier waveform signals (bottom diagram in FIG. 3A). The positive and negative carrier waveform signals are shifted by 180°. It is to be understood that even though FIG. 3A shows the level shifted carrier PWM for carrier waveform signals that have a triangular wave form, this is not limiting to the present disclosure and other waveforms of the carrier waveform signals are also possible in embodiments of the present disclosure, for example a sawtooth waveform.

In this embodiment of the present disclosure, the second switching pattern may be based on the phase shifted carrier PWM (PSC PWM). As elaborated above, the phase shifted carrier PWM is a multicarrier PWM technique which uses a carrier waveform signal for each of the power converter modules. In the phase shifted carrier PWM based switched pattern, a phase shift is introduced between the carrier waveform signals for the individual power converter modules, producing a phase shifted switching between the individual power converter modules. Preferably, however, without being limiting to the present disclosure, in one or more embodiments of the present disclosure, the phase shift φ can be represented by:

$$\varphi = 360/M$$

where M is the number of carrier waveform signals, corresponding to the number M of power converter modules assigned to the second group. In other embodiments of the present disclosure, the phase shift between neighbouring carrier waveform signals does not need to be the same. By way of example, the phase shift may be adjusted to compensate for propagation delays.

Figure 3B:
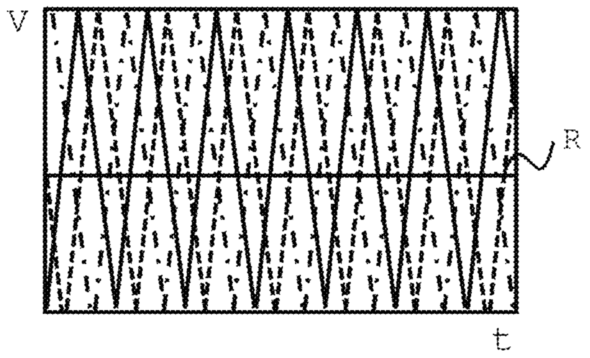
FIG. 3B shows a phase-shifted carrier PWM for three carrier waveform signals.

FIG. 3B shows the phase shifted carrier PWM for three carrier waveform signals. It is to be understood that even though FIG. 3B shows the phase shifted carrier PWM for carrier waveform signals that have a triangular wave form, this is not limiting to the present disclosure and other waveforms of the carrier waveform signals are also possible in embodiments of the present disclosure, for example a sawtooth waveform. Further, there is shown in FIG. 3B that the three carrier waveform signals have the same maximum and minimum value, however, this is also not limiting to the present disclosure.

In this embodiment of the present disclosure, the switching dynamic (switching rate) of the N power converter modules assigned to the first group is lower than the switching dynamic of the M power converter modules assigned to the second group. Therefore, the first group may be called, without being limited to, a "low dynamic modulation" group, while the second group may be called, without being limited to, a "high dynamic modulation group". As elaborated above, the workload (load) distributed to the N power converter modules assigned to the first group is different than the workload (load) distributed to the M power converter modules assigned to the second group.

Both in level shifted carrier PWM and phase shifted carrier PWM, the corresponding carrier waveform signals are compared to a corresponding reference signal R for generating the control signal for the at least two switching elements 12 in the corresponding power converter module 10_*i*. In this way, the switching state of the corresponding power converter module 10_*i* is controlled. In other words, the switching state and hence the scheduling of each power converter module 10_*i* (when to place the power converter modules 10_*i* to be in a conduction state and hence switch from a non-conduction state or a paralleled converter modules configuration state to the conduction state) is controlled based on the comparison between the reference signal R and the corresponding carrier waveform signal.

In some embodiments of the present disclosure, the same reference signal R may be used for the N power converter modules assigned to the first group and for the M power converter modules assigned to the second group.

In other embodiments of the present disclosure the reference signal R may be split into two components: a first reference signal R1 for the N power converter modules assigned to the first group and a second reference signal R2 for the M power converter modules assigned to the second group. In these embodiments of the present disclosure, the first reference signal R1 may be controlled in discrete levels 0/N, 1/N, . . . , N/N (N is the number of power converter modules assigned to the first group) and the second reference signal R2 may be freely controlled. The same result can be achieved as in the embodiments of the present disclosure in which the same reference signal R is used for the N power converter modules assigned to the first group and for the M power converter modules assigned to the second group since it is required that the relative difference between the corresponding reference signal and the corresponding carrier waveform signal is controlled for controlling the switching state of the corresponding power converter module 10_*i*.

The method for controlling the multilevel converter 1 according to the embodiment of the present disclosure further comprises: generating an output signal of the multilevel converter 1 by synthesizing at least the first output signal with the second output signal. Synthesizing can comprise, for example, superimposing at least the first output signal and the second output signal. The output signal is normally a voltage signal. The output signal may correspond to or represent the demanded (desired) voltage signal of the multilevel converter 1.

In one embodiment of the present disclosure, the method further comprises: assigning, based on the at least one variable parameter, a third number L of the plurality of power converter modules 10_1, 10_2, 10_3, . . . 10_*n* to a third group, and further comprises controlling the third number L of the plurality of power converter modules 10_1, 10_2, 10_3, . . . 10_*n* assigned to the third group to be in an inactive state or paralleled power converter modules state for generating a third output signal. L can be 1 or larger than 1. In any case, N+M+L is smaller than or equal to the number of power converter modules of the multilevel converter. In other words, one or more power converter modules of the multilevel converter 1 may not be assigned to any of the first group, the second group and the third group. In other embodiments of the present disclosure, one or more power converter modules may be "virtually" assigned to one of the first group and the second group. These one or more power converter modules may be "virtually" assigned in that they do not actively contribute to the workload distribution within the first group and the second group. Such one or more power converter modules may also be called spared power converter modules and may be controlled to actively contribute to the workload distribution within the first group and the second group if needed.

In embodiments of the present disclosure, the first output signal has a constant (fixed) output voltage. The third output signal may have a 0 V output voltage. In embodiments of the present disclosure, the third number L of the plurality of power converter modules 10_1, 10_2, 10_3, . . . 10_*n* assigned to the third group may be power converter modules that take no current, and hence no workload (load) is distributed to the third number L of the plurality of power converter modules 10_1, 10_2, 10_3, . . . 10_*n* assigned to the third group. These power converter modules may be seen as being controlled to be in a non-conduction state. Power converter modules that take no current are normally bypassed.

In other embodiments of the present disclosure, the third number L of the plurality of power converter modules 10_1, 10_2, 10_3, . . . 10_*n* assigned to the third group take reduced current, or in other words are controlled to be in paralleled power converter modules configuration.

In any case, the third number L of power converter modules assigned to the third group does not actively contribute to building the output voltage signal of the multilevel converter. The third group may therefore be called, without being limited to, "inactive group".

It is to be understood that assigning the third number L of the plurality of power converter modules 10_1, 10_2, 10_3, . . . 10_*n* assigned to the third group is not mandatory. Similar, spared power converter modules may not be necessary. In other words, each one of the plurality of power converter modules 10_1, 10_2, 10_3, . . . , 10_*n* may be assigned either to the first group or to the second group to actively contribute in the generation of the output voltage signal of the multilevel converter 1. In this case, N+M is equal to the number of power converter modules of the multilevel converter. In other embodiments of the present disclosure N+M may be smaller than to the number of power converter modules of the multilevel converter. In these embodiments of the present disclosure, it may not be needed to actively assign the difference between N+M and the number of power converter modules of the multilevel converter to the third group. However, assigning one or more (number L) of the plurality of power converter modules 10_1, 10_2, 10_3, . . . 10_*n* to the third group (or even assigning one or more power converter modules to be spared power converter modules) increases the freedom for assigning each one of the plurality of power converter modules 10_1, 10_2, 10_3, . . . 10_*n* to a particular group, which increases the possibilities for balancing the conduction times of the individual power converter modules 10_1, 10_2, 10_3, . . . , 10_*n* and hence for balancing the distribution of the workload between the individual power converter modules 10_1, 10_2, 10_3, . . . , 10_*n*.

As elaborated above, the switching state of each power converter module 10_*i* is controlled by comparing the carrier waveform signal of the corresponding power converter module 10_*i* with a corresponding reference signal R. In some embodiments of the present disclosure the same reference signal R may be used for the N power converter modules assigned to the first group and for the M power converter modules assigned to the second group. In other embodiments of the present disclosure, the reference signal R may be split into two components: a first reference signal R1 for the N power converter modules assigned to the first group and a second reference signal R2 for the M power converter modules assigned to the second group.

For this, in embodiments of the present disclosure, the method further comprises providing a first reference signal R1 for controlling the switching state of each of the first number N of the plurality of power converter modules 10_1, 10_2, 10_3, . . . , **10_*n* assigned to the first group and providing a second reference signal R2 for controlling the switching state of each of the second number M of the plurality of power converter modules 10_1, 10_2, 10_3, . . . , 10_*n*** assigned to the second group.

In embodiments of the present disclosure in which the third number L of the plurality of power converter modules 10_1, 10_2, 10_3, . . . , **10_*n* are assigned to the third group, the method may also comprise providing a third reference signal for controlling the switching state of each of the third number L of the plurality of power converter modules 10_1, 10_2, 10_3, . . . , 10_*n***, however, the carrier waveform signals of each of the third number L of the plurality of power converter modules is always above the third reference signal.

In other embodiments of the present disclosure, the method further comprises providing a reference signal R for controlling the switching state of each of the first number N of the plurality of power converter modules 10_1, 10_2, 10_3, . . . , **10_*n* assigned to the first group and for controlling the switching state of each of the second number M of the plurality of power converter modules 10_1, 10_2, 10_3, . . . , 10_*n*** assigned to the second group.

As elaborated above, in embodiments of the present disclosure, the second switching pattern may be based on the phase shifted carrier PWM (PSC PWM). In embodiments of the present disclosure, the number M of power converter modules assigned to the second group is 2 or larger than 2 (M≥2). Hence, at least two power converter modules are assigned to the second group. Applying the second switching pattern may comprise therefore providing, for each of the M power converter modules assigned to the second group a corresponding carrier waveform signal, wherein the provided carrier waveform signals for the M converter modules are phase shifted between each other. Hence, the conduction times in this group are evenly distributed among the M power converter modules assigned to the second group. The overall load is defined by the modulation index, which can be controlled by splitting the demanded output voltage of the multilevel converter between the first group and the second group.

In embodiments of the present disclosure, in which a first reference signal R1 and a second reference signal R2 are provided, for each of the M power converter modules assigned to the second group, the corresponding carrier waveform signal is compared with the second reference signal R2 and the switching state of each of the M power converter modules is controlled based on the corresponding comparison of the corresponding carrier waveform signal with the second reference signal R2 for generating a corresponding output signal from each of the M power converter modules. In embodiments of the present disclosure in which the first reference signal R1 and the second reference signal R2 are the same reference signal R, for each of the M power converter modules assigned to the second group, the corresponding carrier waveform signal is compared with the reference signal and the switching state of each of the M power converter modules is controlled based on the corresponding comparison of the corresponding carrier waveform signal with the reference signal R for generating a corresponding output signal from each of the M power converter modules.

The second output signal is generated based on the output signal from each of the M power converter modules.

The first number N of the power converter modules assigned to the first group is configured to provide the demanded number of levels of the demanded output voltage of the multilevel converter 1. For example, if it is required that the demanded output voltage of the multilevel converter 1 is 4.75 Vdc (Vdc being the output voltage of a single DC energy source), up to four levels (for example, one or two or three or four levels) may be generated by the power converter modules assigned to the first group. The rest of the workload may be distributed to the power converter modules assigned to the second group which will generate the remainder of the demanded output voltage. For this, for example three power converter modules may be connected in series and assigned to the first group, and hence the first number N is three (it is also possible that one, or two or four power converter modules are connected in series and assigned to the first group, and hence the first number N may be one, or two or four). The first group for the case N=3 is then accordingly represented by three level shifted carrier waveform signals which are below the first reference signal R1 or the reference signal R all the time. With such approach, the three power converter modules are exposed to the terminal current. Terminal current is the current flowing in/out of the terminal of the last power converter module. In embodiments of the present disclosure in which one or more power converter modules are virtually assigned to the first group, and hence are spared power converter modules as elaborated above, the spared power converter modules will be exposed to a "fraction of the terminal current" (reduced current). These spared power converter modules are connected in a paralleled converter modules configuration state with the three power converter modules which generate the three voltage levels.

Figure 4A:
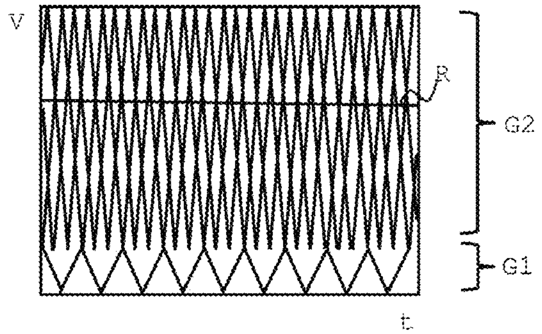
FIGS. 4A and 4B show carrier waveform signals in an embodiment of the present disclosure.
Figure 4B:
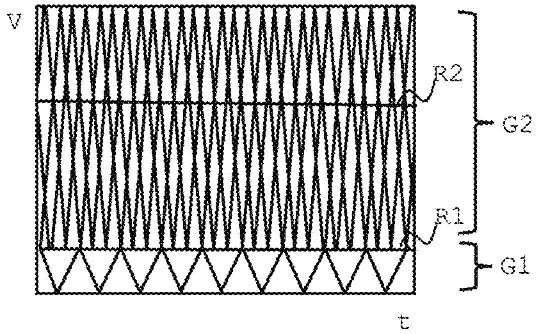

There is shown in FIG. 4A and FIG. 4B schematically the modulation diagram for an embodiment of the present disclosure in which only one module is assigned to the first group. Hence, in this embodiment of the present disclosure N=1, M≥2. It is noted that in FIGS. 4A and 4B there is shown a case with M=3, however, this is an example, since in this embodiment of the present disclosure M≥2. Accordingly, one module is assigned to the first group G1 and at least two modules (three modules are shown in FIGS. 4A and 4B) are assigned to the second group G2. The carrier waveform signals for the M converter modules are phase shifted between each other. The carrier waveform signals for the M converter modules in FIGS. 4A and 4B have the same minimum and maximum value. It is further noted that FIGS. 4A and 4B do not show the third group elaborated above, however, as elaborated above, the assigning, based on the at least one variable parameter, the third number L of the plurality of power converter modules to the third group is optional.

The difference between FIGS. 4A and 4B is that in the embodiment shown in FIG. 4A the first reference signal R1 and the second reference signal R2 are the same reference signal R. For the one power converter module assigned to the first group G1, in the embodiment shown in FIG. 4A, the amplitude level of the carrier waveform signal is set below the amplitude level of the reference signal R. In the embodiment shown in FIG. 4B, the reference signal R is split into two components, first reference signal R1 which is controlled at a predetermined discrete level and a second reference signal R2 which is freely controlled. For the one power converter module assigned to the first group G1, the amplitude level of the carrier waveform signal is set below the amplitude level of the first reference signal R1.

In this embodiment of the present disclosure, applying the first type of switching pattern comprises providing, for the one power converter module assigned to the first group, a corresponding carrier waveform signal, wherein the amplitude level of the corresponding carrier waveform signal is set below the amplitude level of the reference signal R, as is shown in FIG. 4A, or is set below the amplitude level of the first reference signal R1, as is shown in FIG. 4B.

The first output signal is generated based on the output signal from the one power converter module assigned to the first group.

In the embodiment shown in FIG. 4A, for each of the M power converter modules assigned to the second group, the corresponding carrier waveform signal is compared with the reference signal R and the switching state of each of the M power converter modules is controlled based on the corresponding comparison of the corresponding carrier waveform signal with the reference signal R for generating a corresponding output signal from each of the M power converter modules. In the embodiment shown in FIG. 4B, for each of the M power converter modules, the corresponding carrier waveform signal is compared with the second reference signal R2 and the switching state of each of the M power converter modules is controlled based on the corresponding comparison of the corresponding carrier waveform signal with the second component reference signal R2 for generating a corresponding output signal from each of the M power converter modules.

The second output signal is generated based on the output signal from each of the M power converter modules.

Figure 5A:
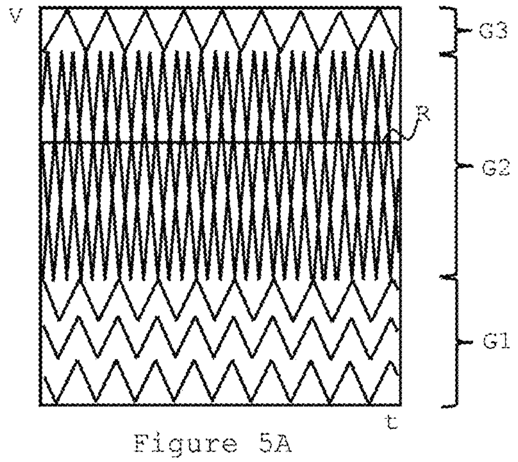
FIGS. 5A and 5B show carrier waveform signals in an embodiment of the present disclosure.
Figure 5B:
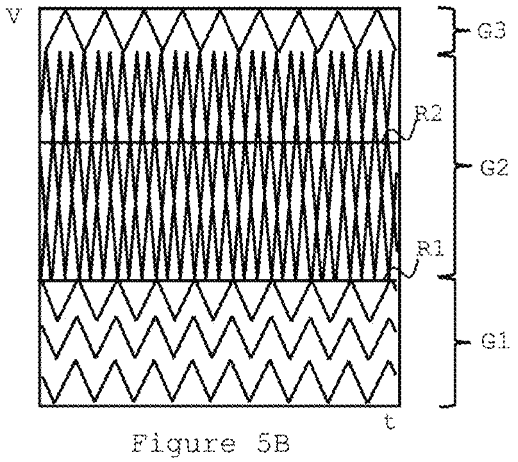

There is shown in FIG. 5A and FIG. 5B schematically the modulation diagram in a different embodiment of the present disclosure in which the first number N of power converter modules assigned to the first group is 2 or larger than 2 (N≥2). It is noted that in FIGS. 5A and 5B there is shown the case when N=3 and M=3, however, this is an example, since in this embodiment of the present disclosure N≥2 and M≥2. The carrier waveform signals for the M power converter modules are phase shifted between each other. The carrier waveform signals for the N power converter modules are level shifted between each other. It is to be noted that even though it is shown in FIG. 5A and FIG. 5B that the three carrier waveform signals for the first group G1 are in phase with each other, this is not limiting, and the three carrier waveform signals may be out of phase, for example may be phase shifted by 180°. Hence, in this embodiment of the present disclosure at least two power converter modules are assigned to the first group G1 and at least two power converter modules are assigned to the second group G2. Further, it is shown in FIG. 5A and FIG. 5B that one power converter module is assigned to the third group (L=1), however, as elaborated above, assigning, based on the at least one variable parameter, one or more power converter modules of the plurality of power converter modules 10_1, 10_2, 10_3, . . . , 10__n_ to the third group is optional.

The difference between FIGS. 5A and 5B is that in the embodiment shown in FIG. 5A the first reference signal R1 and the second reference signal R2 are the same reference signal R. For the N power converter modules assigned to the first group, the amplitude level of the corresponding carrier waveform signal is set below the amplitude level of the reference signal R. In the embodiment shown in FIG. 5B the reference signal R is split into two components, first reference signal R1 which is controlled in discrete levels 0/N, 1/N, . . . , N/N and a second reference signal R2 which is freely controlled. For the N power converter modules assigned to the first group, the amplitude level of the corresponding carrier waveform signal is set below the amplitude level of the first reference signal R1.

In the embodiment of the present disclosure shown in FIG. 5A, applying the first type of switching pattern comprises providing, for each of the N power converter modules assigned to the first group, a corresponding carrier waveform signal, wherein the N carrier waveform signals are set at different amplitude levels, wherein each of the different amplitude levels is set below the amplitude level of the reference signal R. In the embodiment of the present disclosure shown in FIG. 5B applying the first type of switching pattern comprises providing, for each of the N power converter modules assigned to the first group, a corresponding carrier waveform signal, wherein the N carrier waveform signals are set at different amplitude levels, wherein each of the different amplitude levels is set below the amplitude level of the first reference signal R1.

For each of the N power converter modules, the method for controlling the multilevel converter 1 further comprises comparing the corresponding carrier waveform signal with the first reference signal R1 or the reference signal R and controlling the switching state of each of the N power converter modules based on the corresponding comparison of the corresponding carrier waveform signal with the first reference signal R1 or the reference signal R for generating a corresponding output signal from each of the N power converter modules. The first output signal is generated based on the output signal from each of the N power converter modules.

The control of the switching state of each of the second number M of the plurality of power converter modules is performed as elaborated above with reference to FIGS. 4A and 4B. Hence, in the embodiment shown in FIG. 5A, for each of the M power converter modules assigned to the second group, the corresponding carrier waveform signal is compared with the reference signal R and the switching state of each of the M power converter modules is controlled based on the corresponding comparison of the corresponding carrier waveform signal with the reference signal R for generating a corresponding output signal from each of the M power converter modules. In the embodiment shown in FIG. 5B, for each of the M power converter modules, the corresponding carrier waveform signal is compared with the second reference signal R2 and the switching state of each of the M power converter modules is controlled based on the corresponding comparison of the corresponding carrier waveform signal with the second component reference signal R2 for generating a corresponding output signal from each of the M power converter modules.

In an alternative embodiment to the embodiment shown in FIG. 5A and FIG. 5B, for the case when N is 2 or larger than 2, the power converter modules assigned to the first group take a turn in conduction. In other words, a turning off a power converter module 10__i_ (or in other words, controlling the power converter module to switch from a conduction state to a non-conduction state) is complementary substituted by one or more power converter modules being turned on at the same time point when the power converter module 10__i_ is turned off. Such a complementary module switching is achieved by phase shifted carrier PWM with reference signal at discrete values: 0/N, 2/N, . . . , N/N, where N is the number of power converter modules. In other words, in this embodiment of the method for controlling the multilevel converter 1 of the present disclosure, applying the first switching pattern comprises controlling the timing of switching on each of the N power converter modules assigned to the first group so that at least one power converter module is switched on at the same time when at least one another power converter modules is switched off.

The controlling the timing of switching on each of the N power converter modules comprises providing, for each of the N power converter modules, a corresponding carrier waveform signal and providing the first reference signal in discrete levels 0/N, 1/N, 2/n, . . . N/N, wherein the provided carrier waveforms signals for the N converter modules are evenly phase shifted between each other and have discrete reference levels at values 0/N, 1/N, 2/n, . . . N/N.

Hence, a fixed voltage level synthesis is performed by the N power converter modules assigned to the first group G1 by applying edge aligning technique with complementary power converter modules switching.

Figure 6:
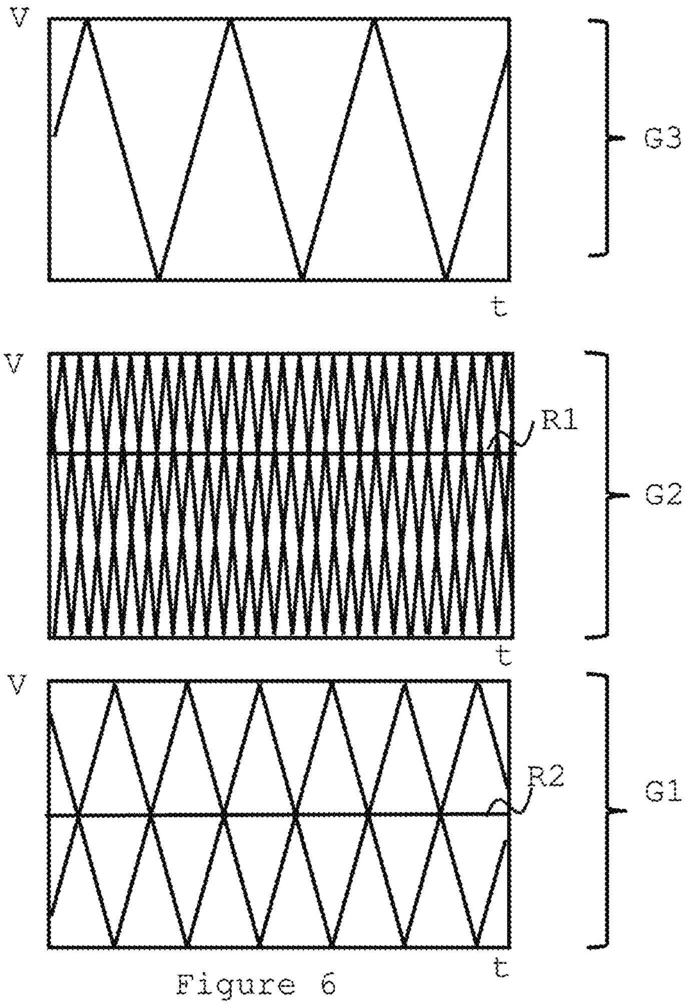
FIG. 6 shows carrier waveform signals in an embodiment of the present disclosure.

The modulation diagram for this embodiment of the present disclosure is shown schematically in FIG. 6. As seen in FIG. 6, the first group and the second group which are based on phase shifted carrier PWM are level shifted between each other.

It is to be noted, that even though in this embodiment described with reference to FIG. 6 it has been described that carrier waveform signals are used, this is only an example. Power converter module scheduling can be performed without any carrier waveform signals. In this case, the precise timing of the power converter module complementary switching needs to be precisely controlled.

The load between the N modules may be equally distributed, however this is not mandatory. It is also possible that some of the N modules receive higher load, while other of the N modules receive lower load.

In the above-described embodiments of the present disclosure, the first output signal is generated based on the output signal from each of the N power converter modules.

In the embodiment of the present disclosure, in steps S100 and S200 the assignment of the first number of modules N of the plurality of power converter modules to the first group G1 and the assignment of the second number M of the plurality of power converter modules to the second group G2 is a dynamic assignment, based on at least one variable parameter. In embodiments of the present disclosure in which the third number L of power converter modules is assigned to the third group, the assignment is performed based on the at least one variable parameter and hence is also dynamic. The assignment of spared power converter modules may also be dynamic.

In embodiments of the present disclosure, the at least one variable parameter is based on at least one of a demanded load (demanded output voltage) and a current direction. For example, the at least one variable parameter can be a load share. Power converter modules with higher load share are assigned at first, for example for a predetermined period of time, to the first group. Power converter modules with lower load share are assigned, for example for the predetermined period of time, to the second group. Power converter modules for which it is not desired to take any current (not to participate in the load share) or to take reduced current at least for the predetermined period of time, are assigned to the third group.

Determining which power converter modules are assigned to the first group and determining which power converter modules are assigned to the second group, and optionally, determining which power converter modules are assigned to the third group, may be based on at least one of temperature of each of the individual power converter modules, current, state of charge of the energy source connected to the corresponding power converter module, state of health of the energy source connected to the corresponding power converter module and similar.

The second number M of the plurality of power converter modules assigned to the second group G2 defines the effective output switching rate of the multilevel converter. The effective output switching rate is important for the output filter design and the output quality of the output voltage signal. The second number M of the plurality of power converter modules assigned to the second group may be determined to be a number which takes into account that it should be high enough not to compromise the quality of the output voltage signal but also low enough not to generate high switching loses. In other words, the determination of the second number M is based on balancing between the quality of the output voltage signal and switching losses. Hence, the demanded output voltage is dynamically split between the first group and the second group. The reference signal of the first group is controlled to achieve the required modulation index in the second group.

The at least one variable parameter is re-evaluated after the expiration of a predetermined time period. The predetermined time period may be in the range of ms or μs. After the at least one variable parameter is re-evaluated, the assignment may be performed again. In other words, since the at least one variable parameter is re-evaluated, the assignment of the first number N of the plurality of power converter modules to the first group and the assignment of the second number M of the plurality of power converter modules to the second group in dynamic. In other words, in the subsequent carrying out of steps S100 and S200 at least one of the power converter modules may be assigned to a different group that the group to which it was assigned in the previous carrying out of steps S100 and S200. The assignment may even remain the same after the at least one variable parameter is re-evaluated.

In other embodiments of the present disclosure, assignment cycles may be defined. The assignment cycle may have the length of the above-elaborated predetermined time period. While the assignment of the power converter modules at least to the first group and the second group between different cycles may be dynamic, several cycles may be grouped for persistent or semipersistent assignment of the power converter modules at least to the first group and the second group.

Figure 7:
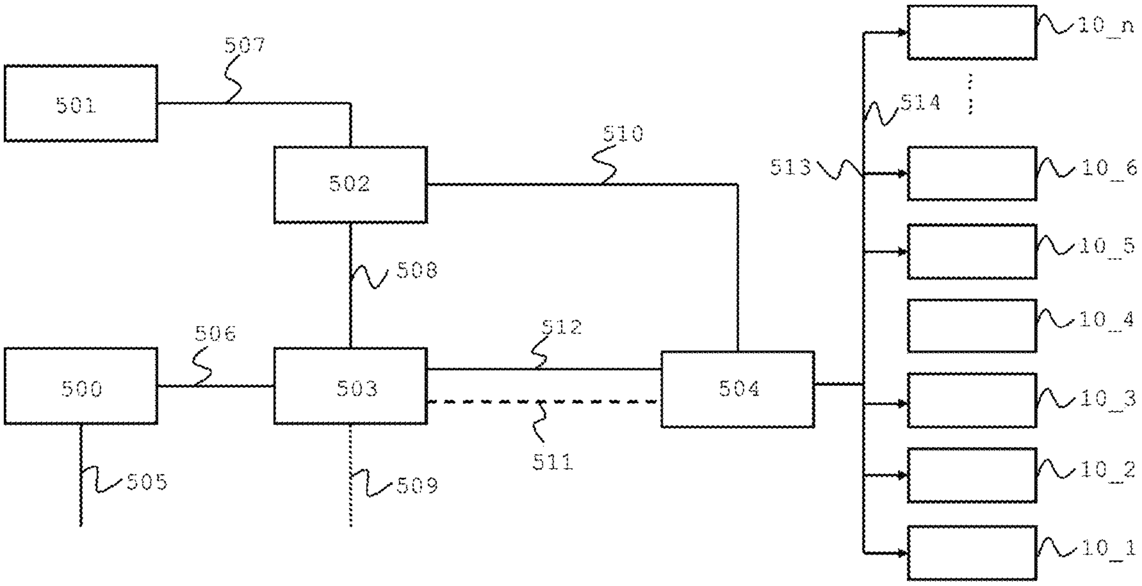
FIG. 7 shows a control block diagram for carrying out the method for controlling the multilevel converter according to the embodiment of the present disclosure.

There is shown in FIG. 7 a control block diagram for carrying out the steps of the method for controlling the multilevel converter 1 according to the embodiment of the present disclosure.

The control block diagram comprises a control unit 500, a voltage splitting unit 503, a module load control unit 501, a module grouping unit 502 and a voltage synthesizer unit 504. Further, there are shown in FIG. 7 the plurality of power converter modules 10_1, 10_2, 10_3, 10_4, 10_5, 10_6, . . . , **10_*n* of the multilevel converter 1**.

At least one or all of the control unit 500, the voltage splitting unit 503, the module load control unit 501, the module grouping unit 502 and the voltage synthesizer unit 504 may be any suitable unit or comprise any suitable unit, such as processing unit, that can perform computer processing. The processing unit may comprise any of a micro processing unit (MCU), a field programmable gate array (FPGA) or application specific integrated circuit (ASIC) or a combination thereof. Further, at least one of the control unit 500, the voltage splitting unit 503, the module load control unit 501, the module grouping unit 502 and the voltage synthesizer unit 504, may comprise a storage unit, such as a memory (not shown in the figure). Alternatively, or additionally, one or more memories may be provided in addition to the control unit 500, the voltage splitting unit 503, the module load control unit 501, the module grouping unit 502 and the voltage synthesizer unit 504. The one or more memories may store different information required for the processing by the control unit 500, the voltage splitting unit 503, the module load control unit 501, the module grouping unit 502 and the voltage synthesizer unit 504. At least one or all of the control unit 500, the voltage splitting unit 503, the module load control unit 501, the module grouping unit 502 and the voltage synthesizer unit 504 may be combined in one or more units.

The control unit 500 may be configured to generate an output reference signal 506. The output reference signal 506 may be a voltage signal representing or corresponding to the demanded output voltage signal of the multilevel converter 1. The control unit 500 may be configured to generate the output reference signal 506 based on a feedback information 505. The feedback information 505 may comprise one or more parameters related to the demanded output signal of the multilevel converter 1. For example, the one or more parameters may be an indication of the number of levels of the demanded output signal. The control unit 500 may send the generated output reference signal 506 to the voltage splitting unit 503.

The module load control unit 501 controls the load (workload) to be distributed to the individual power converter modules from the plurality of power converter modules. The module load control unit 501 may be configured to control the load to be distributed to the individual power converter modules based on at least one of temperature of each of the individual modules, current, state of charge of the corresponding energy source, state of health of the corresponding energy source and similar. The module control unit 501 may be arranged to generate an information regarding the load to be distributed to the individual power converter modules of the plurality of power converter modules and may be arranged to send this information 507, for example to send one or more parameters, to the module grouping unit 502.

The module grouping unit 502 may be configured to assign the power converter modules 10_1, 10_2, 10_3, 10_4, 10_5, 10_5, . . . , **10_*n* in one of the first group and the second group, and optionally in the third group, based on the at least one variable parameter. For example, the module grouping unit 502 may be configured to assign the power converter modules 10_1, 10_2, 10_3, 10_4, 10_5, 10_6, . . . , 10_*n* in one of the first group and the second group, and optionally in the third group, based on the demanded load from the multilevel converter 1. The module grouping unit 502 may be configured to assign one or more of the power converter modules 10_1, 10_2, 10_3, 10_4, 10_5, 10_5, . . . , 10_*n* to be spared power converter modules. The module grouping unit 502 may be arranged to assign the power converter modules 10_1, 10_2, 10_3, 10_4, 10_5, 10_5, . . . , 10_*n* in one of the first group and the second group, and optionally in the third group and/or as spared power converter modules, further based on information regarding the load to be distributed to the individual power converter modules of the plurality of power converter modules received from the module load control unit 501**.

The module grouping unit 502 may be further configured to assign carrier waveform signals of the individual modules 10_1, 10_2, 10_3, 10_4, 10_5, 10_6, . . . , **10_*n* to one of the first group and the second group, and optionally to the third group, based on the demanded load conditions. The module grouping unit 502 may be configured to generate an information 508, 510 regarding the assignment and to send the information 508, for example send one or more parameters to the voltage splitting unit 503. The module grouping unit 502 may be configured to send the same or similar information 510 also to the voltage synthesizer unit 504**.

The voltage splitting unit 503 may be arranged to split the output reference signal 506 received from the control unit 500 into two parts 511, 512. The first part 511 is for the first group and the second part 512 is for the second group. The first part 511 may be or correspond to the first reference signal R1. The second part may be or correspond to the second reference signal R2. As elaborated above, the first reference signal R1 and the second reference signal R2 may be the same reference signal R. The voltage splitting unit 503 may be, optionally, configured to receive a feedback information 509 from one or more external units. The voltage splitting unit 503 may use the feedback information 509 for splitting the output reference signal 506 received from the control unit 500 into two parts 511, 512. The voltage splitting unit 503 may be configured to send a first signal 511 intended for the first group and a second signal 512 intended for the second group to the voltage synthesizer unit 504.

The voltage synthesizer unit 504 may be configured to generate the control signals 513, 514 to be sent to the corresponding power converter modules 10_1, 10_2, 10_3, 10_4, 10_5, 10_6, . . . , **10_*n* depending on the group in which each of power converter module has been assigned. It is shown in FIG. 7 that no control signal 513, 514 is sent to the power converter module 10_4. This means that the power converter modules 10_4 is assigned neither the first group nor to the second group. The voltage synthesiser unit 504, although not shown, also sends a control signal to the power converter modules 10_4. This control signal is a control signal for placing the power converter module 10_4 in a bypass state or paralleled modules configuration state. Hence, this power converter module is bypassed or is in a parallel configuration with one or more other power converter modules. In other words, the power converter module 10_4** may be assigned to the third group or may be a spared power converter module. However, as elaborated above, assigning one or more of the power converter modules to the third group and/or assigning one or more power converter modules as spared power converter modules is entirely optional.

In one embodiment of the present disclosure, a multilevel converter 1 is provided comprising a plurality of energy sources 11 and a plurality of power converter modules 10_1, 10_2, 10_3, . . . , **10_*n*, each power converter module comprising at least two switching elements, the multilevel converter 1** comprising means adapted to execute the steps of the method of the one or more embodiments described above.

Further, in one embodiment of the present disclosure, a computer program comprising instructions is provided, which, when the program is executed by a computer causes the computer to execute the steps of the method of the one or more embodiments described above. Such instructions may be stored in one or more memories.

Hence, according to the present disclosure, a modulation technique for a multilevel converter 1 is provided. The provided modulation technique provides phase-shifted operation which effectively increases the output switching rate and introduces balancing capability. The provided modulation technique does not introduce additional distortion at the module switching rate and its harmonics.

Instead of using a single modulation technique, the present disclosure proposes using at least two modulation techniques for controlling the multilevel converter with different switching dynamic. The at least two modulation techniques may be, for example, phase shifted carrier PWM and level shifted carrier PWM. As elaborated above, PSC PWM and LSC PWM use a carrier waveform signal per power converter module. However, this is not limiting and in embodiments of the present disclosure in which other multilevel modulation techniques are used, more than one carrier waveform signal per power converter module or complex PWM peripherals may be used. The multiple carrier waveform signals may be phase shifted, typically by 180°.

Although detailed embodiments have been described, these only serve to provide a better understanding of the disclosure defined by the independent claims and are not to be seen as limiting.

The invention claimed is:

1. A method for controlling a multilevel converter comprising a plurality of energy sources and a plurality of power converter modules, each power converter module comprising at least two switching elements, the method comprising:

assigning, based on at least one variable parameter, a first number (N) of the plurality of power converter modules to a first group;

assigning, based on the at least one variable parameter, a second number (M) of the plurality of power converter modules to a second group;

providing a first reference signal for controlling a switching state of each of the first number (N) of the plurality of power converter modules assigned to the first group and a second reference signal for controlling a switching state of each of the second number (M) of the plurality of power converter modules assigned to the second group;

controlling the switching state of each of the first number (N) of the plurality of power converter modules assigned to the first group by applying a first switching pattern to the first number (N) of the plurality of power converter modules for generating a first output signal; and controlling the switching state of each of the second number (M) of the plurality of power converter modules assigned to the second group by applying a second switching pattern to the second number (M) of the plurality of power converter modules for generating a second output signal;

wherein the first switching pattern is different than the second switching pattern.

2. The method of claim 1, wherein the first switching pattern is different than the second switching pattern at least in a switching rate of the power converter modules assigned to each of the first group and the second group.

3. The method of claim 1, further comprising:

assigning, based on the at least one variable parameter, a third number (L) of the plurality of power converter modules to a third group; and controlling the third number (L) of the plurality of power converter modules assigned to the third group to be in an inactive state or paralleled power converter modules state for generating a third output signal.

4. The method of claim 3, wherein the first output signal has a constant output voltage, wherein the third output signal has 0 output voltage.

5. The method according to claim 1, further comprising: generating an output signal of the multilevel converter by synthesizing at least the first output signal with the second output signal.

6. The method of claim 1, wherein M is 2 or larger than 2, wherein applying the second switching pattern comprises providing, for each of the M power converter modules a corresponding carrier waveform signal, wherein the provided carrier waveform signals for the M converter modules are phase shifted between each other.

7. The method of claim 1, wherein the first reference signal and the second reference signal are a same reference signal, wherein for each of the N power converter modules an amplitude level of a corresponding carrier waveform signal is set below an amplitude level of the first reference signal.

8. The method of claim 7, further comprising, for each of the M power converter modules, comparing the corresponding carrier waveform signal with the second reference signal and controlling the switching state of each of the M power converter modules based on the corresponding comparison of the corresponding carrier waveform signal with the second reference signal for generating a corresponding output signal from each of the M power converter modules.

9. The method of claim 8, wherein the second output signal is generated based on the corresponding output signal from each of the M power converter modules.

10. The method of claim 1, wherein N is 1, wherein applying a first type of switching pattern comprises providing, for one power converter module assigned to the first group, a corresponding carrier waveform signal, wherein an amplitude level of the corresponding carrier waveform signal is set below an amplitude level of the first reference signal.

11. The method of claim 1, wherein N is 2 or larger than 2, wherein applying a first type of switching pattern comprises providing, for each of the N power converter modules assigned to the first group, a corresponding carrier waveform signal, wherein the N carrier waveform signals are set at different amplitude levels, wherein each of the different amplitude levels is set below an amplitude level of the first reference signal.

12. The method of claim 11, further comprising, for each of the N power converter modules, comparing the corresponding carrier waveform signal with the first reference signal and controlling the switching state of each of the N power converter modules based on the corresponding comparison of the corresponding carrier waveform signal with the first reference signal for generating a corresponding output signal from each of the N power converter modules.

13. The method of claim 12, wherein the first output signal is generated based on the corresponding output signal from each of the N power converter modules.

14. The method of claim 1, wherein N is 2 or larger than 2, wherein applying the first switching pattern comprises controlling timing of switching on of each of the N power converter modules assigned to the first group so that at least one power converter module is switched on at a same time when at least one another power converter modules is switched off.

15. The method of claim 14, wherein controlling the timing of switching on of each of the N power converter modules comprises providing, for each of the N power converter modules, a corresponding carrier waveform signal and providing a first reference signal in discrete levels 0/N, 1/N, 2/N, . . . N/N, wherein the provided carrier waveforms signals for the N converter modules are evenly phase shifted between each other and have discrete reference levels at values 0/N, 1/N, 2/N, . . . N/N.

16. The method of claim 1, wherein the at least one variable parameter is determined based on at least one of a demanded load and current direction, wherein the at least one variable parameter is re-evaluated after expiration of a predetermined time period.

17. A multilevel converter, comprising:

a plurality of energy sources;

the plurality of power converter modules, each power converter module comprising at least two switching elements;

wherein the multilevel converter is configured to perform the method of claim 1.

18. A non-transitory computer-readable storage medium storing a computer program which, when executed by a processor, causes the processor to perform the method of claim 1.

19. A method for controlling a multilevel converter comprising a plurality of energy sources and a plurality of power converter modules, each power converter module comprising at least two switching elements, the method comprising:

assigning, based on at least one variable parameter, a first number (N) of the plurality of power converter modules to a first group, wherein the at least one variable parameter is determined based on at least one of a demanded load and current direction, wherein the at least one variable parameter is re-evaluated after expiration of a predetermined time period;

assigning, based on the at least one variable parameter, a second number (M) of the plurality of power converter modules to a second group;

controlling a switching state of each of the first number (N) of the plurality of power converter modules assigned to the first group by applying a first switching pattern to the first number (N) of the plurality of power converter modules for generating a first output signal; and controlling a switching state of each of the second number (M) of the plurality of power converter modules assigned to the second group by applying a second switching pattern to the second number (M) of the plurality of power converter modules for generating a second output signal;

wherein the first switching pattern is different than the second switching pattern.

* * * * *